United States Patent
Band (10) Patent No.: US 8,065,717 B2
(45) Date of Patent: Nov. 22, 2011

(54) AUTOMATED SECURITY TOKEN ADMINISTRATIVE SERVICES

(75) Inventor: Jamie Angus Band, Palo Alto, CA (US)

(73) Assignee: Activcard, Suresnes Cedex (FR)

( * ) Notice: Subject to any disclaimer, the term of this patent is extended or adjusted under 35 U.S.C. 154(b) by 783 days.

(21) Appl. No.: 10/304,958

(22) Filed: Nov. 27, 2002

(65) Prior Publication Data

US 2004/0103324 A1 May 27, 2004

(51) Int. Cl.
*G06F 7/04* (2006.01)

(52) U.S. Cl. ........... 726/9; 726/20; 380/229; 705/65; 705/66; 705/67; 705/68; 705/69; 713/172; 713/173; 713/174

(58) Field of Classification Search .......... 726/20, 726/27, 9; 713/201, 172–174; 380/229; 705/65–69
See application file for complete search history.

(56) References Cited

U.S. PATENT DOCUMENTS

| | | | | |
|---|---|---|---|---|
| 6,179,205 B1 | 1/2001 | Sloan | | 235/382 |
| 6,273,335 B1 | 8/2001 | Sloan | | 235/382 |
| 6,715,082 B1 * | 3/2004 | Chang et al. | | 726/8 |
| 7,017,188 B1 * | 3/2006 | Schmeidler et al. | | 726/26 |
| 2002/0112178 A1 * | 8/2002 | Scherr | | 713/200 |
| 2003/0087601 A1 * | 5/2003 | Agam et al. | | 455/39 |

FOREIGN PATENT DOCUMENTS

GB  2345232  6/2000

OTHER PUBLICATIONS

"ActivCard Identity Management System—Enterprise Edition," Product data sheet, 2002.

* cited by examiner

*Primary Examiner* — Edan Orgad
*Assistant Examiner* — Roderick Tolentino
(74) *Attorney, Agent, or Firm* — Muirhead and Saturnelli, LLC (57) ABSTRACT

This invention provides a system, method and computer program product to allow a user to access administrative security features associated with the use of a security token. The administrative security features provide the user the ability to unlock a locked security token, diagnose a security token, activate and deactivate a security token, request a replacement security token or temporary password or report the loss of a security token. The invention comprises a client application which integrates into the standard user login dialog associated with an operating system. A portion of the user dialog is linked to a remote server to access the administrative services.

24 Claims, 7 Drawing Sheets

AUTOMATED SECURITY TOKEN ADMINISTRATIVE SERVICES

FIELD OF INVENTION

The present invention relates to a data processing system, method and computer program product and more specifically to a system, method and computer program product for gaining access to administrative security services without having authenticated access to an operating environment.

BACKGROUND

Security token and credential management systems track, monitor and control the state of authentication tokens and credentials assigned to users. Frequently, the security tokens managed by such systems become locked, lost, stolen, damaged, deactivated, or temporarily misplaced by the user. Many of these issues prevent the user from logging into an operating system. In other situations, it is useful for the user to obtain diagnostic information related to a security token prior to logging in. The user may also require temporary access to the operating system via some other means because his or her security token is not available or is non-operational.

In the relevant art, when a user is unable to gain access to the operating system due to unavailability of his or her security token, the options available to correct the situation usually involves a call to a support desk, logging into a restricted guest account or some combination of the two. Present solutions do not offer the user the capability to access the services of a security token management system while logged out or locked out of the operation system.

The support desk option is problematic in that the user may not be able to contact the support staff during non-working hours (e.g., nights and weekends) or during traditionally heavy demand periods (e.g., Monday mornings, following a system interruption, migration to another operating system or software application, etc.)

In certain circumstances, the user may be prevented from accessing an operating system or reporting a lost or stolen security token for an extended period of time (e.g., Christmas Holidays) which not only impacts worker productivity but may lead to future security compromises. Maintaining a full time support staff can be prohibitively expensive for smaller organizations.

Guest accounts provide only limited access to system resources and require that guest accounts be established and maintained on all computers where a potential user may need access to resources which increases the risk of introducing security vulnerabilities.

Thus, an automated mechanism which allows a user to restore access privileges without the intervention of a support organization is highly desirable.

SUMMARY

This invention addresses the above cited limitations and provides a system, method and computer program product for user controlled security token administration.

The invention comprises a local client and a remote server in processing communications over a network, each including all functional components of a computer system such as associated hardware, peripherals, storage devices, operating system and applications software. The network includes local area networks, wide area networks and wireless networks.

The local client further includes an application which provides access to a user controlled security token administration application installed on the remote server and also serves as a communications interface with a locally connected security token. The client application is integrated into the operating system's login access application and user dialog interfaces for example, msgina.dll associated with Microsoft® Windows NT and successor products or a pluggable authentication module (PAM) associated with UNIX® based operating systems. The local client includes normal desktop and laptop computers and thin clients such as personal data assistants (PDA), security token equipped cellular telephones and related wireless devices.

The remote server is a designated authentication server having a unique universal resource locator (URL) number, the applications software and stored verification data to implement the invention. An example configuration is described in a product description sheet, "ActivCard® Identity Management System," by the assignee of the invention. The product description sheet is herein incorporated by reference.

The integrated login dialog interface provides one-stop access to either the operating system or the user controlled security token administration application. In one embodiment of the invention, a portion of the user login dialog interface is actually remotely displayed by the server using HTML, XML or equivalent protocols but appears to the user as a local application. Accessing the user controlled security token administration application does not require the normal user login procedures but does require the user to correctly supply at least one credential known or otherwise available to the user such as a biometric scan entry, password, PIN, passphrase or responses to a question and answer session. The credential is used for identifying the user and establishing the user's access privileges to services and resources.

To ensure that the user is actually communicating with the proper remote server, a host authentication session is performed using public key cryptography methods such as traditional challenge/response or digital certificate exchange. Once the server is authenticated to the local client, the user may be prompted to supply his or her credentials. Once the user has been authenticated to the remote server, based on comparisons to previously stored credentials, the user may initiate one or more functions including diagnostics of the security token, reactivating or deactivating the security token, requesting a replacement security token, requesting and enabling a temporary password or automatically granting access to previously unavailable services and resources.

The administrative application installed on the remote server processes the user request and performs the functions by sending the appropriate command strings and security codes to the security token via the client application to service the request. In situations where a temporary password is requested, the newly enabled password is visually displayed for a limited period of time.

In an alternate embodiment of the invention, the remote server may be replaced by an internal security token application which is invokeable by the user. In this embodiment of the invention the user performs essentially the same authentication process as described for the remote server embodiment but communicates locally with the security token directly via the local client application. Authentication of the security token to the user is performed by visual confirmation or by recognition of the authentication dialogs occurring between the user and the security token.

The communications between the local client and remote server is performed using a secure messaging protocol such as IPsec, SSL, SSH, TLS, WAP or equivalent.

DETAILED DESCRIPTION

This invention provides a system, method and computer program product for user controlled security token administration without having to establish an active session.

Figure 1:
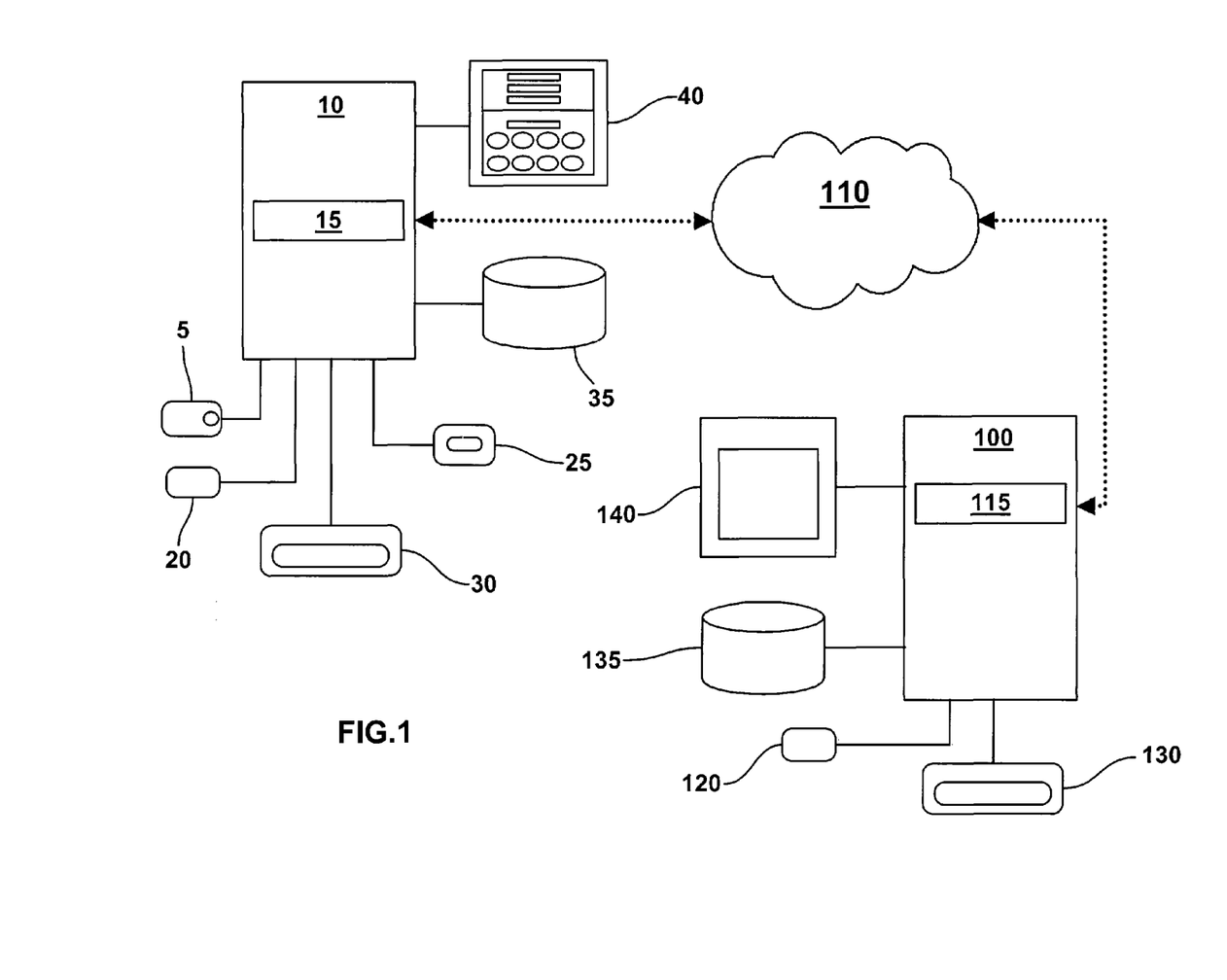
FIG. 1—is a generalized block diagram illustrating the invention.

Referring to FIG. 1, the invention comprises a local client 10 and a remote server 100 in processing communications over a network 110, both the local client 10 and remote server 100 include user input devices such as keyboards 30, 130, and mice 20, 120, displays 40, 140, operating systems, applications software 15, 115 and memory storage devices 35, 135. The displays 40, 140 may include touch sensitive screens as another user input devices. The local client 10 further includes a biometric scanner 25 as an alternative to memorized credentials (e.g., PINs, passwords, passphrases, question and answer sessions) and a security token 5.

The security token 5 includes security resources and information such as cryptographic keys and algorithms for accessing system resources and services following authentication of the user. A user authentication mechanism included in the security token is provided with a changeable security state to prevent fraudulent use of the token. For example, a common anti-fraud counter installed in security tokens limits the number of incorrect PIN entries to a predetermined number. If the predetermined number is exceeded, the security token is placed in a locked security state which requires receipt of specific unlock information in order to reset the anti-fraud counter and regain use of the security token.

The applications software 15 installed on the local client 10 provides access to a user controlled security token administration application 115 installed on the remote server 100 and also serves as a communications interface with the locally connected security token 5. The client application 15 is integrated into the operating system's login access application and user dialog interfaces such as msgina.dll associated with the WINLOGON.EXE program included in Microsoft® Windows NT and successor products or a pluggable authentication module (PAM) associated with UNIX® based operating systems.

Communications over the network 110 between the local client and remote server is performed using a secure messaging protocol such as IPsec, SSL, SSH, TLS, WAP or equivalent.

The administrative application 115 installed on the remote server allows a local user to access administrative services related to user access without having to establish an active session with the local operating environment or receive assistance from a support organization. The administrative application includes the ability to authenticate the user based on a supplied biometric sample, password, passphrase, PIN, question and answer session or any combination thereof.

Figure 1A:
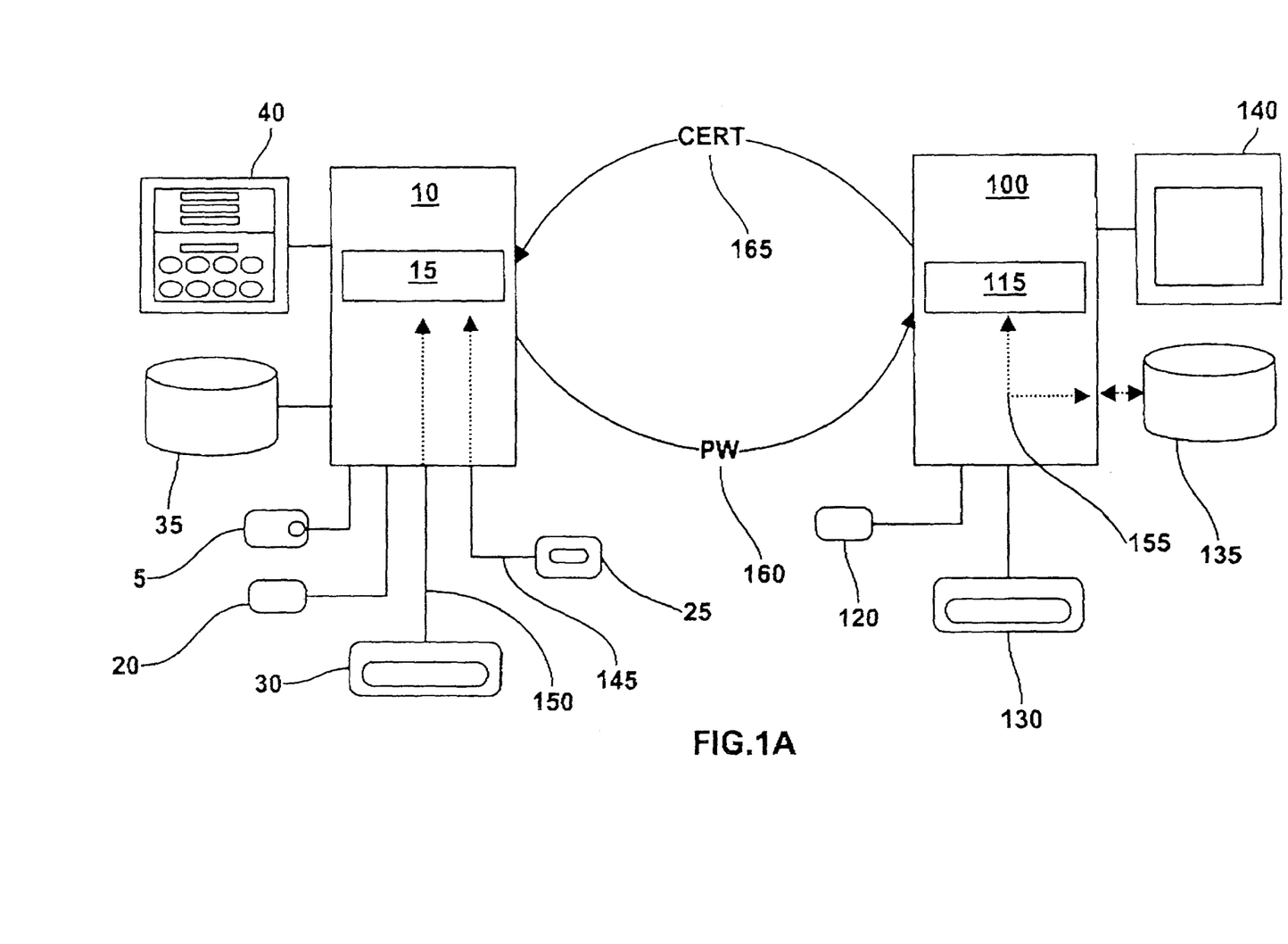
FIG. 1A—is a generalized block diagram illustrating a mutual authentication session between a client and a remote server.

FIG. 1A depicts a mutual authentication cycle between the local client 10 and the remote server 100. A user located at the local client 10 selects a function from a dialog box displayed on the display 40. The selection causes the remote server to first authenticate to the client using public key infrastructure method. A digital certificate 165 is used as an example in FIG. 1A. Once the remote server 100 has been successfully authenticated, the user either supplies a biometric sample 145, or memorized credential 150 depicted as a password PW 160. Equivalent memorized credentials include passphrases, PINs, interactive question and answer sessions using the display 40, or any combination thereof. The results of which are sent to the remote server 100 for authentication. The received credential is authenticated by comparing 155 the received credential to those retrieved from storage 135.

Figure 1B:
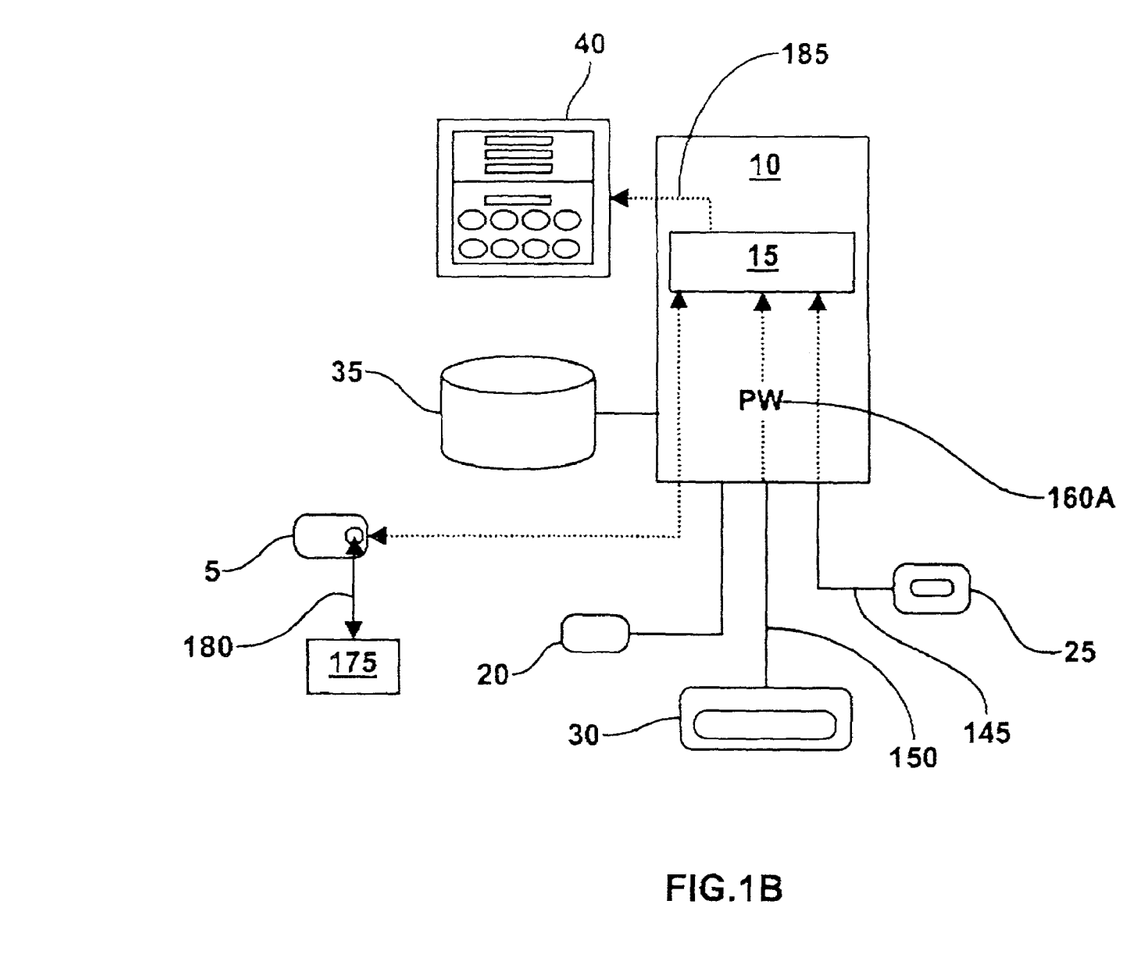
FIG. 1B—is a generalized block diagram illustrating an alternate embodiment of the invention.

FIG. 1B depicts an alternate embodiment of the invention where access to administrative services are performed locally using the client application 15 and a token application 175 installed inside the security token 5. As before, the user located at the local client 10 selects a function from the dialog box displayed on the display 40. The selection causes the token application 175 to authenticate the user. The user either supplies a biometric sample 145, or memorized credential 150 depicted as a password PW 160A.

The biometric sample 145 or credential PW 160A is sent 180 to the security token 5 for processing by the token application 175. If the user is authenticated, access to the security token resources and services is provided by changing a security state within the security token.

Figure 2:
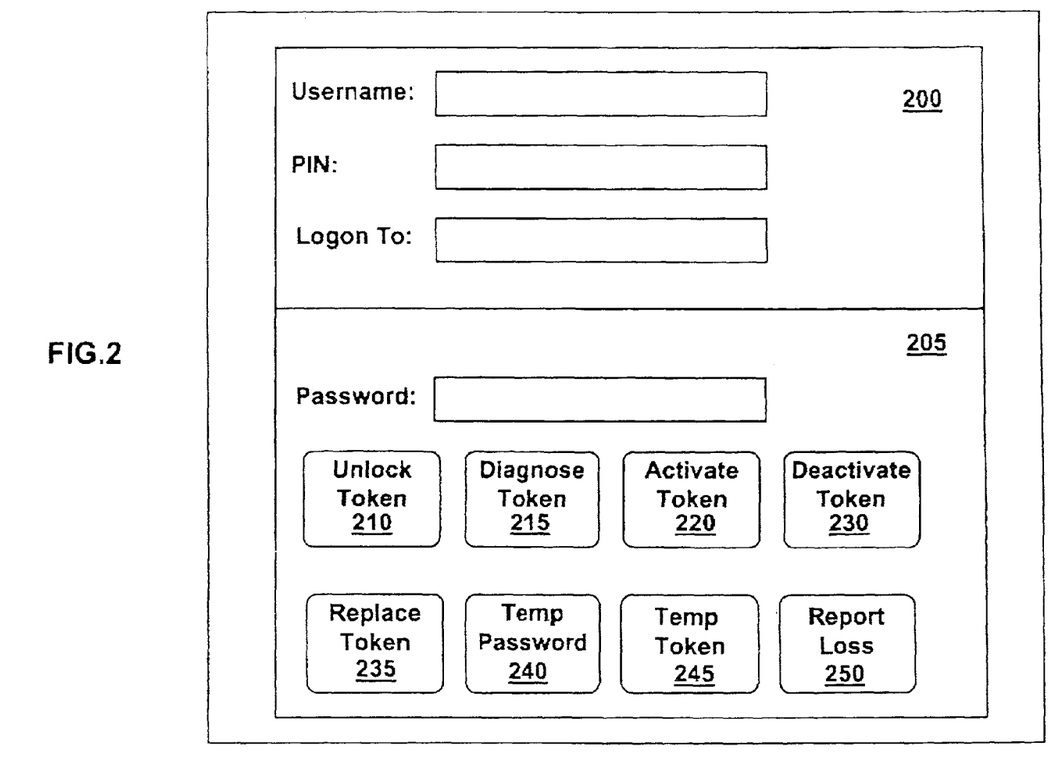
FIG. 2—is a detailed block diagram illustrating a user interface dialog.

FIG. 2 depicts an example user interface display provides normal authenticated access to system resources and services 200 or allows selection of administrative services 205 if the user is unable to gain normal access. The upper portion of the user dialog 200 is generated by the local operating system. The lower portion of the user interface display 205 in the preferred embodiment of the invention is a remote web page which is displayed locally. The web page may be constructed using hypertext markup language (HTML), extensible markup language (XML) or variations thereof. In an alternate embodiment of the invention, the lower portion of the user interface display 205 is generated locally and accesses the remote server application once a selection is made.

Examples of available options include unlocking a locked security token 210, diagnosing a security token which may be malfunctioning 215, activating a security token 220, deactivating a security token, requesting a replacement security token 235, requesting a temporary password 240, requesting a temporary security token 245 and reporting the loss of a security token 250. All of the options may be considered as security states in which the user desires a change. One skilled in the art will appreciate that other options to suit a particular security or administrative requirement may be provided as well.

Figure 2A:
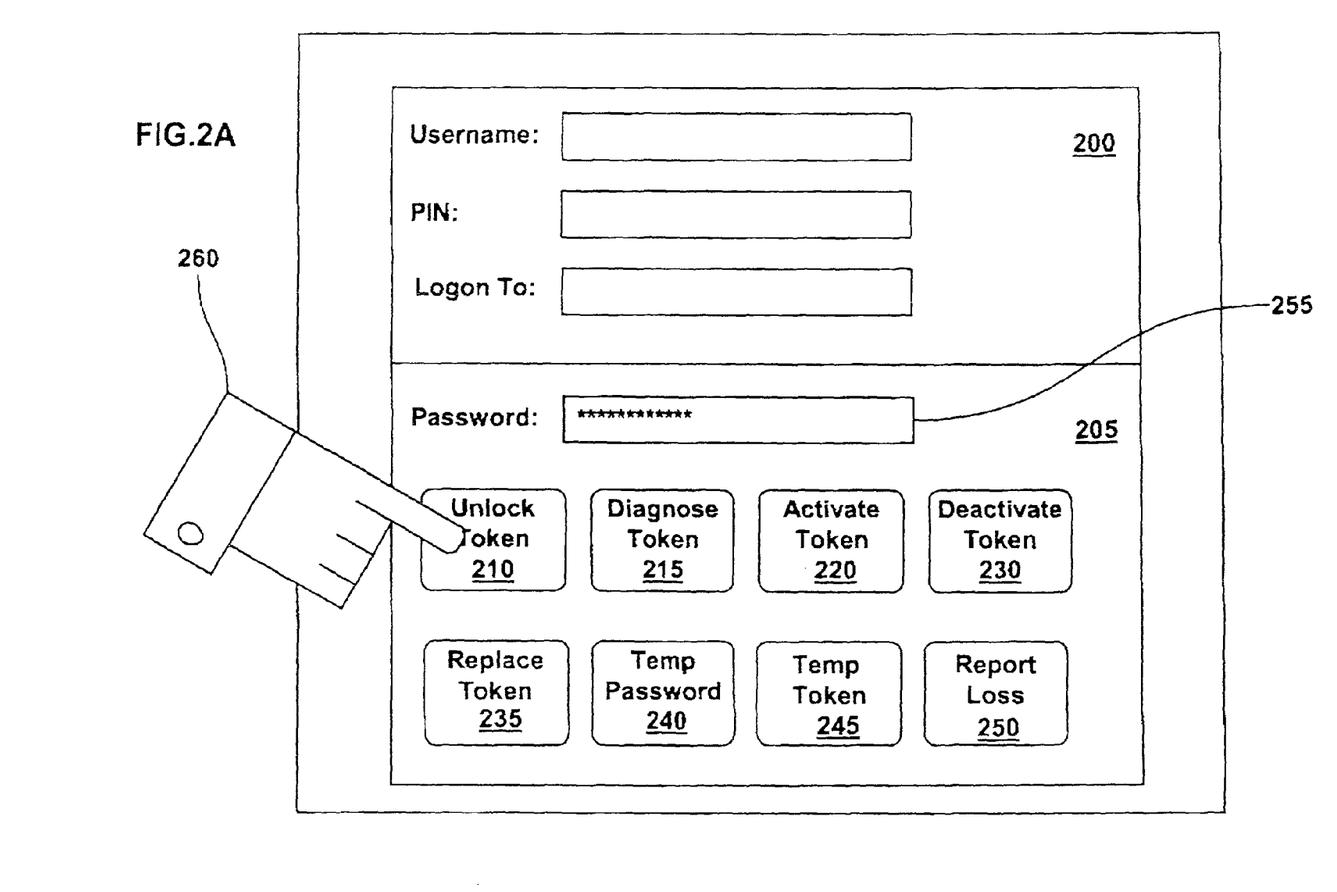
FIG. 2A—is a detailed block diagram illustrating the selection of an option available from the user interface dialog.

Referring to FIG. 2A, an example session is shown where a user 260 selects the unlock security token option 210. A password 255 is then provided to authenticate the user to the remote server.

Figure 3:
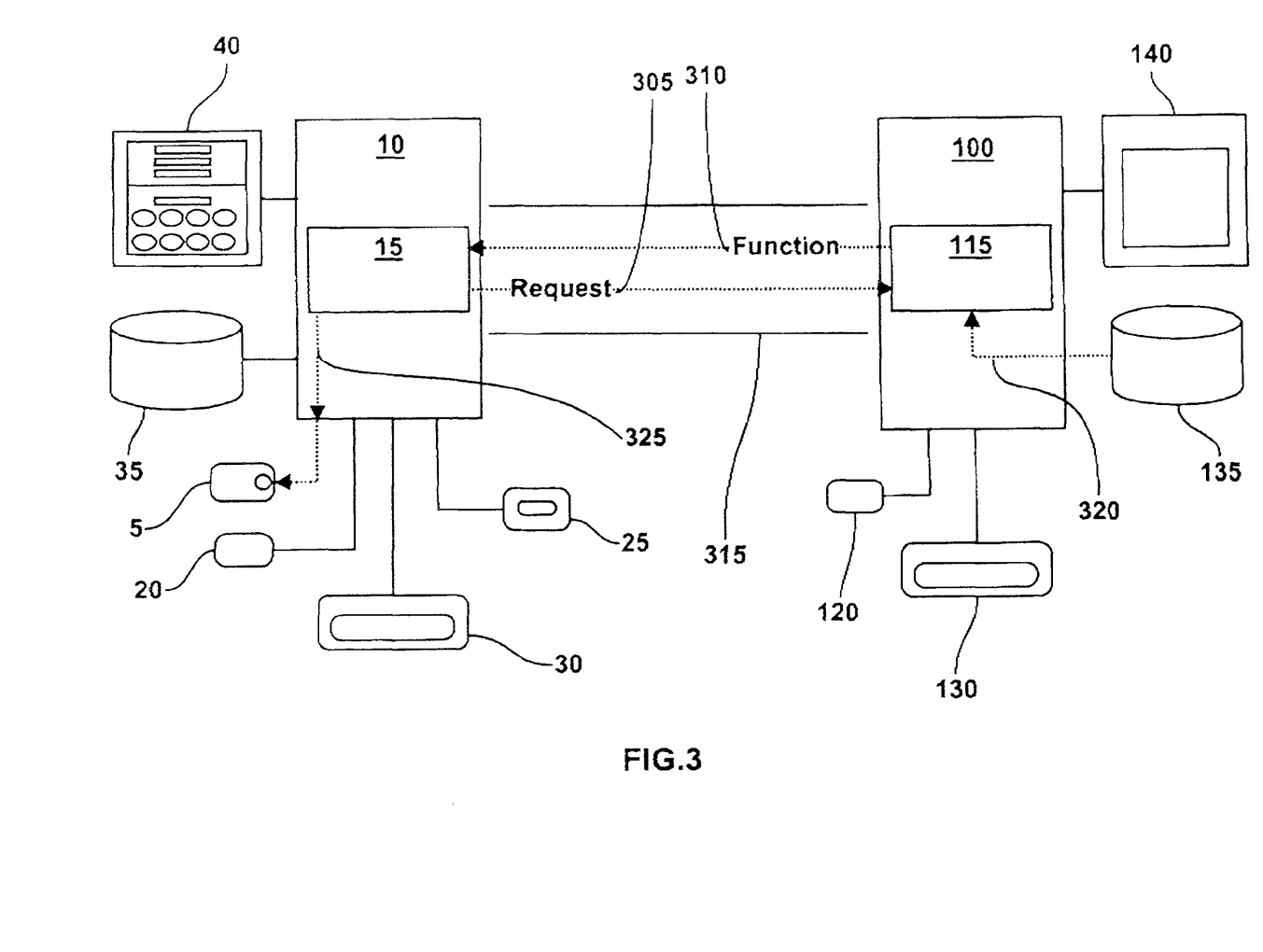
FIG. 3—is a detailed block diagram illustrating processing of a request by the remote server.

Referring to FIG. 3, the request 305 to unlock the security token is sent to the remote server 115 using the secure messaging protocol 315 for example, IPsec, SSL, SSH, TLS, WAP or equivalent. The request is processed by the remote server application 115 which retrieves 320 the proper function 310 from storage 135. The function 310 is sent to the local client application 15 for routing 325 into the security token 5 for final processing.

Figure 4:
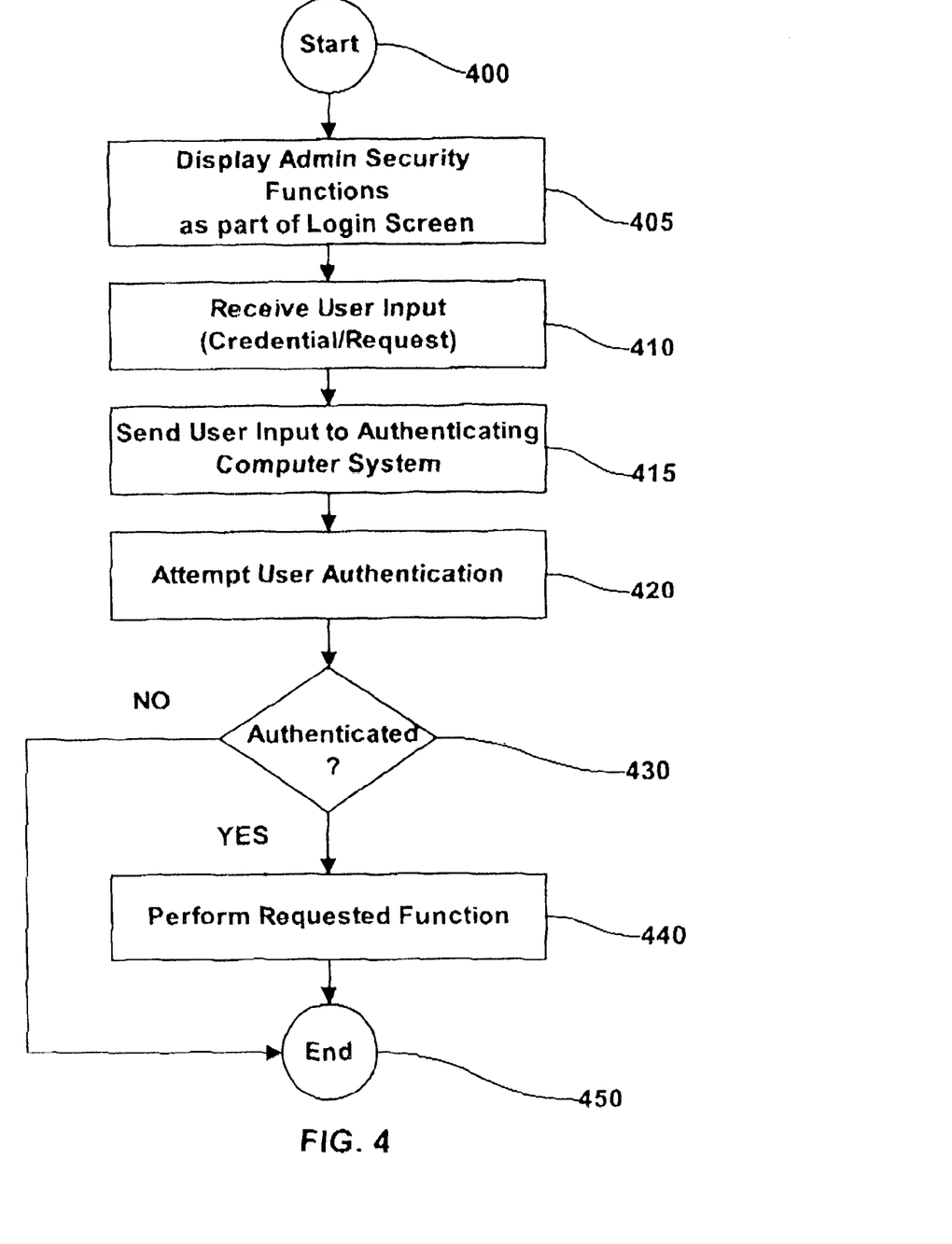
FIG. 4—is a flowchart illustrating the major steps for implementing the invention.

Lastly, FIG. 4 depicts the major steps in implementing the invention. The process is initiated 400 by a user reviewing available administrative security functions displayed 405 on a display associated with a local client. The user is then prompted to enter a credential 410. The user's request and credential are then sent to the authenticating computer system for processing 415. The authenticating computer system attempts to authenticate the entity 420. The authenticating computer system may be a locally connected security token or a remote server. If the user is not authenticated 430, processing ends 450. If the entity is authenticated 430, the requested service is performed 440 on a locally connected security token and processing ends 450.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. Other variations and embodiments are possible in light of above teachings, and it is not intended that this Detailed Description limit the scope of invention, but rather by the Claims following herein.

What is claimed is:

1. A system allowing a security token user to perform at least one administrative security function on his security token, whereby said user does not need to login in an operating system, the system comprising:
   at least one credential associated with said user;
   an authenticating computer system;
   a local client in processing communications with an authenticating computer system including;
      one or more functionally connected user input devices;
      a user interface for handling input from and output to said user;
      an access request generator that generates and sends an administrative access request to said authenticating computer system to perform said at least one administrative security function, wherein said administrative access request includes said at least one credential; and
      a mediating section that mediates said at least one administrative security function between said authenticating computer system, said client and said user; and wherein said authenticating computer system includes:
      a security section that is responsive to said administrative access request for performing said at least one administrative security function, wherein said at least one administrative security function includes an authenticating section that authenticates said user to said authenticating computer system using said at least one credential and an access section that allows access to system resources and services, without logging said user on to an operating environment associated with said local client, wherein:
   if said user is authenticated, said at least one administrative security function is retrieved and sent to said local client for routing into said security token and said at least one administrative function is performed on the security token, and
   if said user authentication fails, the attempt to perform said at least one administrative function on the security token is ended.

2. The system according to claim 1 wherein said authenticating computer system is a remote server.

3. The system according to claim 1 wherein said authenticating computer system is a locally connected security token.

4. The system according to claim 3 wherein said security section is a security token application.

5. A system allowing a security token user to perform at least one administrative security function on his security token, whereby said user does not need to login in an operating system, the system comprising:
   at least one credential associated with said user;
   a security token functionally connected to a local client including a user authentication mechanism, wherein said user authentication mechanism includes a changeable security state,
   said changeable security state operative to mediate access to system resources and services;
   said local client in processing communications with a server including:
      one or more functionally connected user input devices;
      a user interface for handling input from and output to said user;
      an access request generator that generates and sends an administrative access request to said server to perform said at least one administrative security function, wherein said administrative access request includes said at least one credential;
      a mediating section that mediates at least one administrative security function between said server, said client and said security token; and
   said server including:
      a security section that is responsive to said administrative access request for performing said at least one administrative security function, wherein said at least one administrative security function includes an authenticating section that authenticates said user to said server using said at least one credential and a security state altering section that alters changeable security state, without logging said user on to an operating environment associated with said local client, wherein:
   if said user is authenticated, said at least one administrative security function is retrieved and sent to said local client for routing into said security token and said at least one administrative function is performed on the security token, and
   if said user authentication fails, the attempt to perform said at least one administrative function on the security token is ended.

6. The system according to claim 2 or 5 further including a mutual authentication section.

7. The system according to claim 6 wherein said server is authenticated to said client using a public key infrastructure methodology.

8. The system according to claim 6 wherein said at least one administrative security function further includes an unlocking section that unlocks said security token.

9. The system according to claim 6 wherein said at least one administrative security function further includes a diagnostic section that performs diagnostics on said security token.

10. The system according to claim 6 wherein said at least one administrative security function further includes a reactivating/deactivating section that reactivates or deactivates said security token.

11. The system according to claim 6 wherein said at least one administrative security function further includes a requesting section that requests a replacement security token.

12. The system according to claim 6 wherein said at least one administrative security function further includes an enabling section that enables a temporary password.

13. The system according to claim 5 wherein said at least one administrative security function further includes an access section that automatically allows said user access to said system resources and services.

14. The system according to claim 6 wherein said at least one administrative security function further includes a reporting section that reports that said security token has been lost, damaged or stolen.

15. The system according to claim 6 wherein said processing communications includes a secure communications protocol.

16. The system according to claim 15 wherein said secure communications protocol includes SSL, SSH, TLS, WAP or IPSEC.

17. The system according to claim 7 wherein said public key infrastructure methodology includes challenge/response authentication or digital certificate exchange.

18. The system according to claim 6 wherein said at least one credential includes a passphrase, password, PIN, biometric scan, question and answer session or a combination thereof.

19. A method allowing a security token user to perform at least one administrative security function on his security token, whereby said user does not need to login in an operating system, the method comprising the steps of:
 displaying said at least one administrative security function on a user interface display,
 receiving a credential from a user interface input device without logging on to an operating environment associated with said local client,
 causing a request for said at least one administrative security function to be sent to an authenticating computer system, wherein said request includes said credential,
 attempting to authenticate said user using said credential,
 if said user is authenticated, retrieving said at least one administrative security function, sending said at least one administrative security function to said local client for routing into said security token, and performing said at least one administrative function on the security token, and
 ending the attempt to perform said at least one administrative function on the security token if said user authentication fails.

20. The method according to claim 19 further including the step of authenticating said authenticating computer system to said client.

21. The method according to claim 19 wherein said authenticating computer system is a locally connected security token.

22. The method according to claim 19 wherein said authenticating computer system is a server.

23. The method according to claim 19 wherein said at least one administrative function is performed on a security token associated with said user.

24. A computer program product embodied in a tangible form readable by a computer system having executable instructions stored thereon for causing the computer system to allow a security token user to perform at least one administrative security function on his security token, whereby said user does not need to login in an operating system, said executable instructions comprising the actions of:
 causing a client application to display said at least one administrative security function on a user interface display associated with said local client,
 causing said client application to receive said user's request for said at least one administrative security function from a user input device,
 causing a credential input by said user in combination with said user's request to transmit said at least one administrative security function over a network to a remote server,
 causing a server application to receive said request and said credential from said network,
 causing said server application to authenticate said user using said credential against a stored reference, and
 if said user is authenticated, causing retrieval of said at least one administrative security function, causing said at least one administrative security function to be sent to said local client for routing into said security token, and causing the performance of said at least one administrative function on the security token, and
 ending the attempt to perform said at least one administrative function on the security token if said user authentication fails, wherein
 said actions are executed without logging said user on to an operating environment associated with said local client.

* * * * *